(12) United States Patent
Craven et al.

(10) Patent No.: US 11,454,728 B2
(45) Date of Patent: Sep. 27, 2022

(54) REAL-TIME KINEMATICS FOR A VEHICLE SYSTEM

(71) Applicant: Westinghouse Air Brake Technologies Corporation, Wilmerding, PA (US)

(72) Inventors: Stephen Craven, Hiawatha, IA (US); Jeffrey D. Kernwein, Cedar Rapids, IA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 17/080,309

(22) Filed: Oct. 26, 2020

(65) Prior Publication Data

US 2021/0039692 A1 Feb. 11, 2021

Related U.S. Application Data

(63) Continuation-in-part of application No. 15/855,427, filed on Dec. 27, 2017, now Pat. No. 10,859,714.

(51) Int. Cl.
| | |
|---|---|
| *G01S 19/50* | (2010.01) |
| *B61L 25/02* | (2006.01) |
| *B61L 15/00* | (2006.01) |
| *G01S 19/04* | (2010.01) |
| *G01S 19/43* | (2010.01) |
| *B61L 27/04* | (2006.01) |
| *B61L 27/70* | (2022.01) |

(52) U.S. Cl.
CPC ............ *G01S 19/50* (2013.01); *B61L 25/025* (2013.01); *B61L 15/0027* (2013.01); *B61L 27/04* (2013.01); *B61L 27/70* (2022.01); *B61L 2205/04* (2013.01); *G01S 19/04* (2013.01); *G01S 19/43* (2013.01)

(58) Field of Classification Search
CPC .......... G01S 19/04; G01S 19/43; G01S 19/40; G01S 19/50; B61L 27/0005; B61L 27/04; B61L 25/025; B61L 17/0027; H04B 7/18545
USPC ............................ 342/357.33, 357.23, 357.2
See application file for complete search history.

(56) References Cited

U.S. PATENT DOCUMENTS

| | | | | |
|---|---|---|---|---|
| 5,391,987 A | * | 2/1995 | Koike | B60L 13/06 246/249 |
| 5,682,139 A | * | 10/1997 | Pradeep | G01S 13/825 455/12.1 |
| 6,434,509 B1 | * | 8/2002 | Tsuchiya | G01S 5/0063 702/158 |

(Continued)

*Primary Examiner* — Chuong P Nguyen
(74) *Attorney, Agent, or Firm* — The Small Patent Law Group LLC; Christopher R. Carroll

(57) ABSTRACT

A communication system includes communication units onboard a vehicle system. A first unit receives satellite positioning data and correction data based on phase measurements of satellite signals. A second unit receives the satellite positioning data. One or more processors determine a first geographical position of the first unit based on the position correction data and the satellite positioning data. The processors communicate the position correction data or a copy thereof to the second unit. The processors determine second geographical position data of the second unit based on the position correction data and the satellite positioning data. The one or more processors communicate the second geographical position data that is determined to the first communication unit.

17 Claims, 4 Drawing Sheets

(56) References Cited

U.S. PATENT DOCUMENTS

| | | | | |
|---|---|---|---|---|
| 7,742,850 B2* | 6/2010 | Kane | ............ | B61L 25/021 |
| | | | | 701/19 |
| 8,751,073 B2* | 6/2014 | Kumar | ............ | B61L 25/021 |
| | | | | 701/19 |
| 9,260,123 B2* | 2/2016 | Fanara | ............ | B61L 25/028 |
| 9,476,990 B2* | 10/2016 | Kim | ............ | G01S 19/48 |
| 10,884,133 B2* | 1/2021 | Kim | ............ | G01S 19/44 |
| 10,967,895 B2* | 4/2021 | Bauer | ............ | B61L 15/0054 |
| 2016/0178755 A1* | 6/2016 | Kim | ............ | G01S 19/426 |
| | | | | 701/468 |
| 2017/0254901 A1* | 9/2017 | Kim | ............ | G01S 19/22 |
| 2019/0196022 A1* | 6/2019 | Rezaei | ............ | G01S 19/41 |

\* cited by examiner

REAL-TIME KINEMATICS FOR A VEHICLE SYSTEM

CROSS-REFERENCE TO RELATED APPLICATIONS

This application is a continuation-in-part of U.S. patent application Ser. No. 15/855,427, which was filed on 27 Dec. 2017, and the entire disclosure of which is incorporated herein by reference.

BACKGROUND

Technical Field

The subject matter described herein relates to control of single or multi-vehicle systems based on determining positions of the vehicle systems.

Discussion of Art

In connection with the control one or more operations of a train, sometimes called "positive train control" (PTC), it can be desirable to be able to dynamically ascertain the position of the train as it travels along a track. Presently, global positioning systems (GPS) can be used to dynamically determine positions of a train and dead reckoning techniques may be used when GPS is not available.

When GPS is used, a lead vehicle of the train can include a first GPS receiver coupled to or part of a head of train (HOT) unit used for train control, and the last vehicle of the train can include a second GPS receiver coupled to or as part of an end of train (EOT) unit. In response to receiving a sample of GPS satellite data, the first GPS receiver can determine and output a first geographical location of the lead vehicle of the train and the first GPS receiver. In response to receiving the same or a different sample of GPS satellite data, the second GPS receiver can determine and output a second geographical location of the last vehicle of the train and the second GPS receiver.

The rate that each of the first and second GPS receivers sample GPS satellite data (e.g., between 1 Hz and 10 Hz) can be sufficiently fast that variances in the time each GPS receiver samples GPS satellite data can have little or no effect on the ability of the GPS receiver to dynamically determine the geographical location of the receiver when the GPS satellite data was sampled, or the determination and use of the first and second geographical locations of the lead and last vehicles determined from said samples in connection with train control. Each GPS receiver can sample GPS satellite data periodically and/or aperiodically as deemed suitable and/or desirable.

Upon the second GPS receiver determining a second geographical location of the last vehicle of the train based on the sampled GPS satellite data, the EOT can communicate this second geographical location to the HOT via a communication link (e.g., a wireless communication link) between the HOT and EOT. Because the HOT is now aware of the second geographical location communicated to the HOT by the EOT, and is aware of the first geographical location of the lead vehicle from the output of the first GPS receiver based on GPS satellite data sampled thereby, the HOT can control one or more operations of the train based on these first and second geographical locations.

The process of the first and second GPS receivers sampling GPS satellite data and determining the first and second geographical locations of the lead and last vehicles of the train can be repeated (e.g., continuously) as long as desired as an aid to the safe operation of the train.

First and second geographical locations of the lead and last vehicles of train based on GPS satellite data can have an accuracy of ≤7.8 meters with a 95% probability (see e.g., https://www.gps.gov/systems/gps/performance/accuracy/). However, it would be desirable to improve this accuracy, e.g., within 1-4 centimeters, without the introduction of additional, possibly expensive and power hungry, hardware (e.g., receiver).

BRIEF DESCRIPTION

In one embodiment, a system includes a first communication unit including a first receiver configured to be disposed onboard a vehicle system. The first receiver is configured to receive satellite positioning data and to receive position correction data that is based on phase measurements of satellite signals. The system also includes a second communication unit including a second receiver configured to be disposed onboard the vehicle system in a different location than the first receiver, the second receiver configured to receive the satellite positioning data. The system also includes one or more processors configured to determine first geographical position data corresponding to a first geographical position of the first receiver based on the position correction data and the satellite positioning data received by the first receiver. The one or more processors are configured to communicate the position correction data or a copy of the position correction data to the second communication unit. The one or more processors are configured to determine second geographical position data corresponding to a second geographical position of the second receiver based on the position correction data received at the second communication unit and the satellite positioning data received by the second receiver. The one or more processors are configured to communicate the second geographical position data that is determined to the first communication unit.

In another embodiment, a method includes receiving satellite positioning data at a first communication unit onboard a vehicle system, receiving position correction data that is based on phase measurements of satellite signals at the first communication unit, receiving the satellite positioning data at a second communication unit onboard the vehicle system, determining first geographical position data corresponding to a first geographical position of the first communication unit based on the position correction data and the satellite positioning data received by the first communication unit, receiving the position correction data or a copy of the position correction data at the second communication unit, determining second geographical position data corresponding to a second geographical position of the second communication unit based on the position correction data received at the second communication unit and the satellite positioning data received by the second communication unit, and communicating the second geographical position data that is determined to the first communication unit.

In one embodiment, a system includes a first communication unit configured to be disposed onboard a vehicle system at a first location. The first communication unit is configured to receive satellite positioning data and position correction data that is based on phase measurements of satellite signals from an off-board station. The first communication unit is configured to determine a first geographical position of the first communication unit based on the position correction data and the satellite positioning data. The system also includes a second communication unit configured to be disposed onboard the vehicle system at a second location that is different from the first location. The second communication unit is configured to receive the satellite positioning data and the position correction data. The second communication unit is configured to determine a second geographical position of the second communication unit based on the position correction data and the satellite positioning data. The second communication unit is configured to communicate the second geographical position to the first communication unit for use in controlling an operation of the vehicle system.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
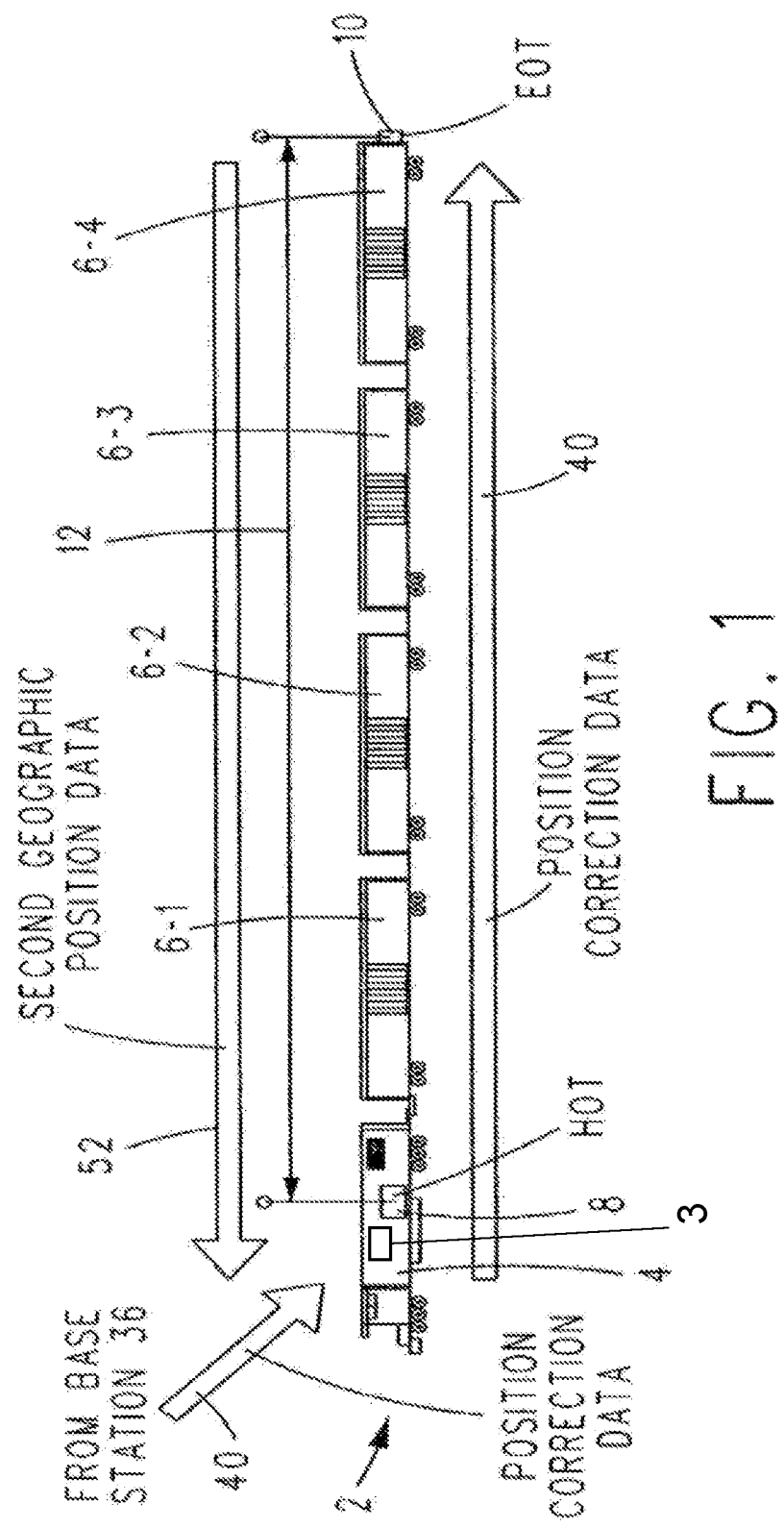
FIG. 1 illustrates a vehicle system.

The inventive subject matter described herein includes systems and methods that determine and/or adjust geographic locations of a communication devices onboard vehicle systems, as determined from data received from off-board sources (e.g., GPS satellite radio positioning data) using real-time kinematic (RTK) position correction data communicated via a ground-based base station to one onboard communication device (on the vehicle system), which is communicated to another onboard communication device (on the same vehicle system) via a communication link (e.g., a wireless and/or wired communication link).

In one example, position correction data is combined with the satellite radio positioning data received by each of the onboard communication devices to determine more accurate geographic locations of the onboard communication devices over the geographic locations of the onboard communication devices determined from the GPS satellite radio positioning data alone.

Using the combination of the position correction data and the satellite radio positioning data, the accuracy of the geographic locations of the onboard communication devices (e.g., the user range error (URE)) expressed as a radius from a calculated position to an actual position, can be determined to be nominally within 1 centimeter (cm)±2 parts-per-million (ppm) horizontally and 2 cm±2 ppm vertically. This is in contrast to the geographic locations of the onboard communication devices determined only using GPS data wherein the URE is ≤7.8 meters (m), with 95% probability.

In one embodiment, a method includes receiving, by first and second radio receivers mounted to respective lead and last vehicles of a vehicle system (e.g., a train or other type of vehicle system), satellite radio positioning data; receiving, by the first radio receiver, position correction data; determining first geographical position data corresponding to a first geographical position of the first radio receiver based on the position correction data received by the first radio receiver and the satellite radio positioning data received by the first radio receiver; receiving a copy of the position correction data received by the first radio receiver at the last vehicle of the vehicle system (where the copy of the position correction data received by the first radio receiver is communicated from the first vehicle of the vehicle system to the second vehicle of the vehicle system); determining second geographical position data corresponding to a second geographical position of the second radio receiver based on the position correction data received at the second vehicle of the vehicle system and the satellite radio positioning data received by the second radio receiver; and receiving the second geographical position data that is determined at the first vehicle of the vehicle system from the second vehicle of the vehicle system. The first vehicle may be disposed at a leading end of the vehicle system along a direction of movement of the vehicle system and the second vehicle may be disposed at an opposite, trailing end of the vehicle system along the direction of movement of the vehicle system. The first receiver may be included in or coupled with a head of train (HOT) unit onboard the leading vehicle and/or the second receiver may be included in or coupled with an end of train (EOT) unit onboard the trailing vehicle. The vehicle system may be a rail vehicle system with the first and second vehicles being locomotives or rail cars. Optionally, the vehicle system may be formed from other types of vehicles, such as automobiles, trucks, mining vehicles, agricultural vehicles, marine vessels, etc. The vehicle system may be formed from a single vehicle with the first and second receivers being at different locations on the vehicle, or may be formed from multiple vehicles with the receives onboard different vehicles (but not necessarily the leading and trailing vehicles in the vehicle system). The vehicles in the multi-vehicle system may be mechanically coupled with each other (e.g., by couplers) or may be separate from each other but logically coupled with each other (e.g., by wirelessly communicating with each other to coordinate movements so that the vehicles move together as a convoy).

The method also can include controlling at least one operation of the vehicle system based on at least the second geographical position data that is received at the first vehicle from the second vehicle.

The first geographical position data can be determined by one or more first processors and/or the first radio receiver, and the second geographical position data can be determined by one or more second processors and/or the second radio receiver. The first processor(s) can be mounted to the first vehicle and/or the second processor(s) can be mounted to the second vehicle of the train.

The copy of the position correction data can be communicated wirelessly from the first vehicle to the second vehicle. The second geographical position data received at the first vehicle can be wirelessly communicated from the second vehicle to the first vehicle.

The position correction data can be wirelessly received by the first radio receiver from a ground base station (e.g., a beacon or other communication device). The position correction data can include a distance and/or a direction to adjust the satellite radio positioning data received by the first and second radio receivers to determine the respective first geographical position data and the second geographical position data.

Another method includes receiving, by a first radio receiver, satellite radio positioning data; receiving, by the first radio receiver, position correction data; determining, by one or more first processors and/or the first radio receiver, a geographical location of the first radio receiver based on the satellite radio positioning data that was received and the position correction data that was received; receiving, by a second radio receiver, the satellite radio positioning data; receiving, by a second processor from the one or more first processors, a copy of the position correction data received by the first radio receiver; and determining, by the one or more second processors and/or the second radio receiver a geographical location of the second radio receiver based on the satellite radio positioning data that was received and the position correction data that was received.

The method also can include receiving (by the one or more first processors from the one or more second processors) the geographical location of the second radio receiver that was determined. A communication link can communicatively connect the first and second processors. The copy of the position correction data can be received by the second processor(s) from the first processor(s) via the communication link. The geographical location of the second radio receiver can be received by the first processor(s) from the second processor(s) via the communication link. The communication link can be a radio link, another type of wireless link, a wired connection, or a combination of a wireless and/or wired link. The satellite radio positioning data can be GPS satellite radio positioning data; and the position correction data can be RTK position correction data.

The first processor(s) can be located on a lead vehicle of a vehicle system and the second processor(s) can be located on a last vehicle of the vehicle system. The first radio receiver and the first processor(s) can comprise a HOT unit of a train and the second radio receiver and the second processor(s) can comprise an EOT unit of the train.

Another method includes providing, in a first vehicle of a vehicle system, a first communication unit; providing, in a second vehicle of the same vehicle system, a second communication unit; providing a communication link between the first communication unit and the second communication unit; receiving, by the first communication unit, first satellite position data and position correction data; determining, by the first communication unit, a first geographic location of the first communication unit based on the first satellite position data and the position correction data received by the first communication unit; receiving, by the second communication unit, second satellite position data; receiving, by the second communication unit from the first communication unit via the communication link, a copy of the position correction data received by the first communication unit; (h) determining, by the second communication unit, a second geographic location of the second communication unit based on the second satellite position data and the position correction data received by the second communication unit; and receiving, by the first communication unit from the second communication unit, a copy of second geographic location of the second communication unit.

The method also can include controlling, by the first communication unit, at least one operation of the vehicle system based on at least the second geographic location of the second communication unit received by the first communication unit from the second communication unit.

The position correction data can include a distance and/or a direction that the first satellite position data and the second satellite position data are adjusted to determine the respective first geographic location of the first communication unit and the second geographic location of the second communication unit. The first and second satellite position data can be the same or can differ from each other.

Various non-limiting examples will now be described with reference to the accompanying figures where like reference numbers correspond to like or functionally equivalent elements. For purposes of the description hereinafter, the terms "end," "upper," "lower," "right," "left," "vertical," "horizontal," "top," "bottom," "lateral," "longitudinal," and derivatives thereof shall relate to the example(s) as oriented in the drawing figures. However, it is to be understood that the example(s) may assume various alternative variations and step sequences, except where expressly specified to the contrary. It is also to be understood that the specific example(s) illustrated in the attached drawings, and described in the following specification, are simply exemplary examples or aspects of the inventive subject matter. Hence, the specific examples or aspects disclosed herein are not to be construed as limiting.

FIG. 1 illustrates one example of a vehicle system 2. The vehicle system includes at least one propulsion-generating vehicle 4 and optionally one or more non-propulsion-generating vehicles 6 (e.g., vehicles 6-1 through 6-4). The vehicle system is shown as a rail vehicle system formed from a locomotive as the propulsion-generating vehicle and four rail cars as the non-propulsion-generating vehicles, but optionally may not be a rail vehicle system, may include a different number of non-propulsion-generating vehicles, may not include any non-propulsion-generating vehicles, and/or may include more than one propulsion-generating vehicles. The vehicle 4 can be the lead vehicle of the vehicle system and the vehicle 6-4 can be the trail or trailing vehicle of the vehicle system.

The vehicle system can include a first communication unit 8 that represents hardware circuitry having or coupled with one or more processors (e.g., integrated circuits, microprocessors, field programmable gate arrays, etc.) that communicate data signals to monitor the status and/or operation of the vehicle system. The first communication unit can include one or more transceivers, modems, antennas, receivers (e.g., GPS receiver), or the like. The first communication unit can update an operator of the vehicle system with the status of one or more operations of the vehicle system and which can be used by the operator to control the operation of the vehicle system. In one embodiment, the first communication unit can be a HOT unit. The vehicle system can include a second communication unit 10 disposed in another location on the vehicle system. For example, the first and second communication units can be disposed at opposite ends of the vehicle system, as shown in FIG. 1. Alternatively, the first and/or second communication unit may be disposed in another location that is not at the leading or trailing end of the vehicle system. The second communication unit can include hardware circuitry similar or identical to the first communication unit. In one embodiment, the second communication unit is an EOT unit. The first and second communication units can be in bi-directional communication with each other via a wired and/or wireless communication link 12. In one example, the communication link can include a radio link.

Figure 2:
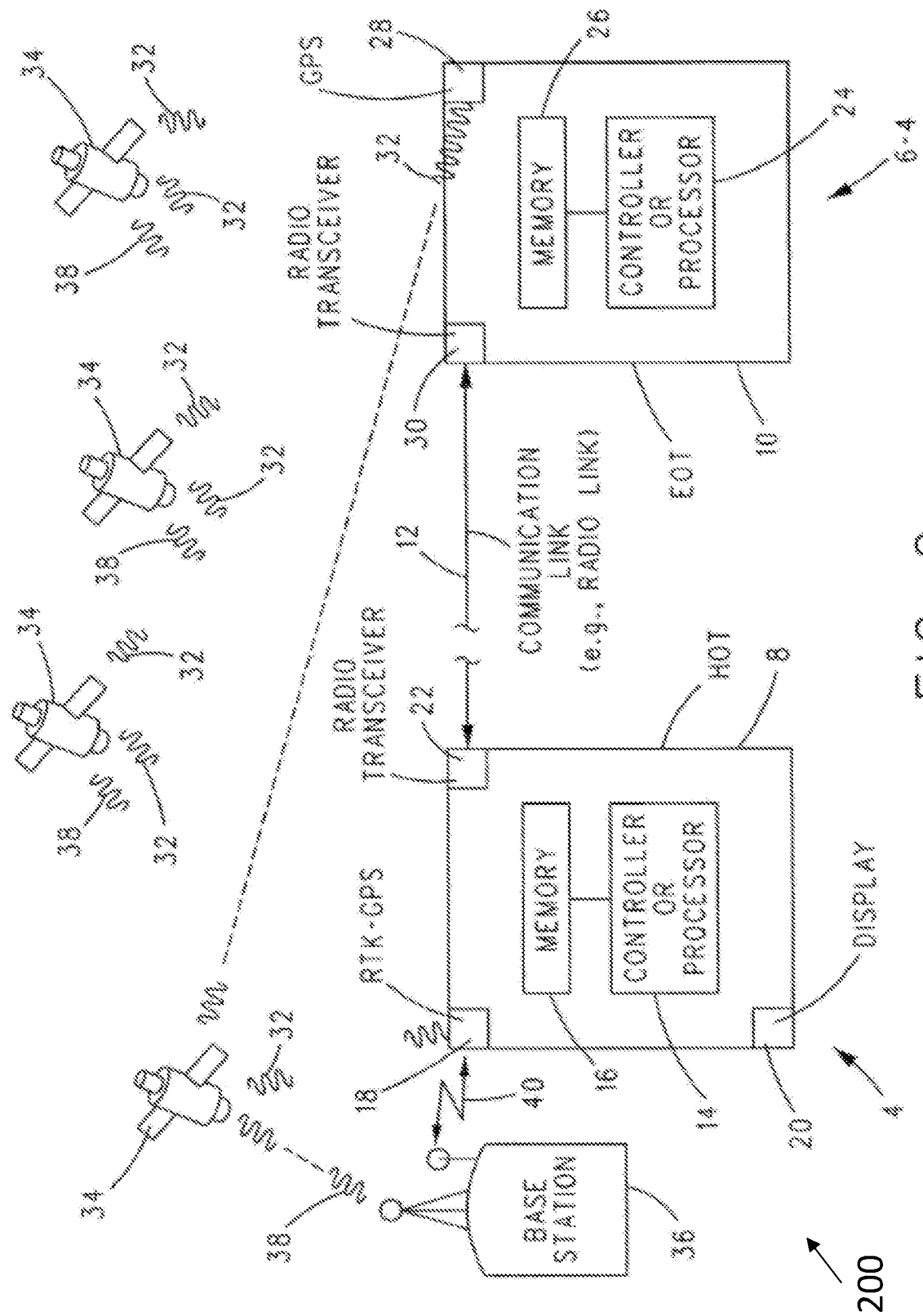
FIG. 2 illustrates a communication system of the vehicle system shown in FIG. 1.

FIG. 2 illustrates a communication system 200 of the vehicle system shown in FIG. 1. The communication system includes the first and communication units. As shown, the first communication unit 8 can include one or more first controllers or first processors 14, a first memory 16, a first receiver 18, a first display 20, and a first transceiver 22. The second communication unit can include one or more second controllers or second processors 24, a second memory 26, a second receiver 28, and a second transceiver 30. The receivers and transceivers can be radio receivers and radio transceivers, or can be another type of wireless receivers and wireless transceivers. The communication link between the communication units can be a radio link supported by radio transceivers 22 and 30, or can be another type of wireless link or communication path.

The receivers can be configured to receive off-board originated positioning signals 32 from one or more off-board sources 34. For example, these transceivers can receive satellite signals from one or more satellites that include GPS signals. Alternatively, the signals may be other signals that include information on the location of the off-board source and/or the transceivers, and/or may be sent from other devices (e.g., land-based beacon, other vehicles, etc.). The off-board sources can communicate positioning data in these signals, and receivers 18 and 28 can each receive the positioning data from the off-board sources. This positioning data can enable the receivers (or processors) to determine the respective first and second geographical positions of the receivers (e.g., on the surface of the earth) with a first degree of accuracy or probability.

A base station 36 positioned at a known geographical position also can receive signals 38 from the off-board sources. These signals can be communicated by the same or different off-board sources that sent the signals received by the receivers (described above). The base station can represent hardware circuitry that includes and/or is connected with one or more processors, and may include transceiving circuitry described herein. The base station determines RTK position correction data 40 from phase measurements of the off-board originated signals from the off-board sources. For example, the base station also can receive the satellite signals and determine the RTK position correction data from those signals. The base station can send the correction data to the receiver(s), such as the receiver of the first communication unit. The position correction data communicated from base station to the receiver of the first communication unit can be based on a technique known as RTK that uses carrier-based ranging and provides ranges that are orders of magnitude more precise than those available through GPS data positioning.

The first receiver of the first communication unit can receive the positioning data from which a GPS position of the receiver can be determined. The first receiver can receive position correction data from the base station. After the first receiver receives the positioning data 32 and correction data 40, the first receiver (e.g., the first processor(s)) can determine first geographical position data corresponding to a first geographical position of the first receiver. This first position data can be determined with a second, greater degree of accuracy or probability based on the position correction data and the positioning data received by first receiver. More specifically, the correction data and the positioning data received by the first receiver can be combined to more accurately and/or more precisely determine a first position (e.g., a first geographical location) of the first receiver than using just the GPS satellite radio positioning data alone. For example, the range or bounds of error or uncertainty in the determined location may be significantly less.

Due to power consumption and size limitations, the second receiver of the second communication unit may not be equipped to receive RTK position correction data directly from the base station. During the reading by first processor(s) of the data stream output by the first radio receiver (where the data stream includes the first geographical position data corresponding to the first geographical position of the first receiver), the first receiver also samples the position correction data included in this data stream.

The position correction data sampled by the first processor(s) can be forwarded to the second processor(s) via the communication link between the first and second communication units. In response to receiving this position correction data from the first communication unit, the second processor(s) of the second communication unit can combine this position correction data with the GPS positioning data output by the second receiver to obtain second geographical position data corresponding to a second geographical position of the second receiver with a second degree of accuracy or probability that is greater than the first degree of accuracy of probability that can be achieved utilizing only the GPS satellite positioning data received by the second receiver.

The position correction data received by the first receiver can be utilized to determine the geographical position of the second receiver more precisely than the use of GPS satellite radio positioning data received by second receiver alone. Use of the communication link to dispatch position correction data from the first communication unit to the second communication unit avoids the need for the second receiver to include capabilities for receiving the RTK position correction data directly from the base station.

Once the second geographical position data corresponding to the second geographical position of the second receiver has been determined, this second geographical position data is dispatched by the second processor(s) of the second receiver to the first processor(s) of the first communication unit via the communication link (or another communication link).

The first geographical position data corresponding to the first geographical position of the first receiver 18 and the second geographical position data corresponding to the second geographical position of the second receiver 30 can be used by processor(s) 14 of the communication unit 8. For example, one or both of the first and second geographical positions can be displayed on a display 20 of the first communication unit. In another example, at least one operation of the vehicle system can be controlled based on at least the second geographical position data received by processor(s) 14 of the first communication unit 8 from the processor(s) 24 of the second communication unit 10. One example of controlling the operation of the vehicle system can include the operator manually controlling or the system automatically controlling the speed of the vehicle system along a speed-limited length of routes in a manner that avoids at least the trailing end vehicle 6-4 from being above the speed limit established for that section of the routes. Stated differently, the operator knowing the second geographical position of the second communication unit can operate the vehicle system 2 in a manner that avoids the speed of the trailing vehicle from exceeding the speed limit along a pre-determined length of the route on which the vehicle system is traveling.

For example, the vehicle system can include a controller 3 (shown in FIG. 3), which can represent hardware circuitry having or coupled with one or more processors that control operation of the vehicle system. One example of the controller can be an engine control unit or other device that controls propulsion and/or braking of the vehicle system. The controller can use the geographical position data to speed up or slow down movement of the vehicle system. The controller can compare the positions of the first and second communication units to determine changing distances between the first and communication units (e.g., based on changes in slack in couplers between the vehicles, based on differences in speeds among the vehicles that are traveling together as a vehicle system without being coupled with each other, etc.). The controller can direct or automatically controller one or more vehicles to increase or decrease speed to change the distance between the communication units. For example, responsive to determining that the distance between the communication units is too far (e.g., farther than a threshold associated with an upper limit on the tensile strength of a coupler, approaching a limit on the communication range of a communication unit, etc.), the controller can direct one or more propulsion-generating vehicles at or ahead of the second communication unit to increase speed and/or direct one or more vehicles (propulsion-generating or non-propulsion-generating) at or behind the first communication unit to slow down (e.g., by decreasing throttle and/or engaging brakes) to reduce the distance between the communication units. Responsive to determining that the distance between the communication units is too close (e.g., closer than a threshold associated with an upper limit on the compressive strength of a coupler, closer than or approaching a safe braking distance between vehicles, etc.), the controller can direct one or more vehicles (propulsion-generating or non-propulsion-generating) at or ahead of the second communication unit to reduce speed (e.g., by decreasing throttle and/or engaging brakes) and/or direct one or more vehicles at or behind the first communication unit to increase speed to increase the distance between the communication units.

The first geographical position data and/or the second geographical position data at the processor(s) of the first communication unit can be updated periodically or aperiodically (not on a regular, repeated basis) as deemed suitable and/or desirable. The second geographical position data can be forwarded from second communication unit to the first communication unit periodically and/or aperiodically as deemed suitable and/or desirable. The first geographical position data can be determined by the processor(s) 14, receiver 18, or the combination thereof. The second geographical position data can be determined by the processor(s) 24, receiver 28, or the combination thereof. In an example, the first communication unit can be mounted to the lead vehicle of the vehicle system and the second communication unit can be mounted to the last vehicle (vehicle 6-4) of the vehicle system. Alternatively, the first communication unit and/or second communication unit can be in another location onboard the vehicle system along the length of the vehicle system.

The copy of the position correction data received at the second communication unit or device can be wirelessly communicated from the first communication unit or device via the communication link 12. In an example, the second geographical position data received by the first communication unit is wirelessly communicated via the communication link from the second communication unit.

Figure 3:
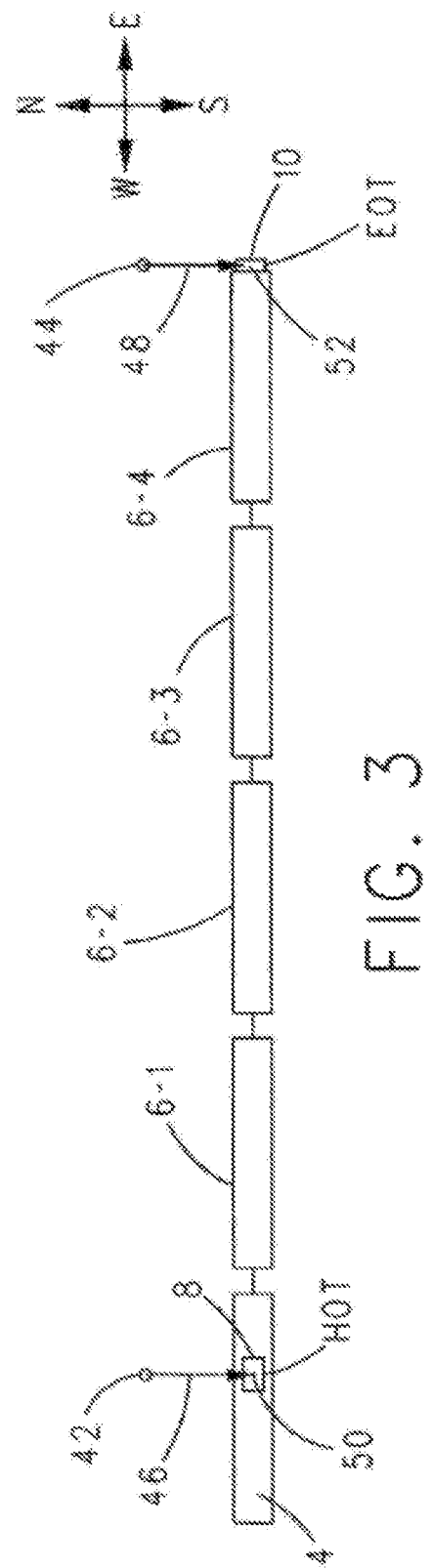
FIG. 3 also illustrates the vehicle system and the communication system shown in FIGS. 1 and 2.

With reference to FIG. 3 and with continuing reference to FIGS. 1 and 2, in response to receiving GPS satellite positioning data 32, the receivers 18 and 28 place the geographical positions of the first and second communication units 8, 10 at locations 42, 44 (respectively), e.g., north of the actual locations of the first and second communication units by distances 46, 48 (respectively). The position correction data 40 enables the calculated first and second geographical position data to be adjusted to more closely correspond to the actual first and second geographical positions of the receiver 18 of the first communication unit 8 and the receiver 28 of the second communication unit 10.

In an example, the position correction data 40 includes a distance and a direction to adjust the geographical positions of the first and second communication units determined based on GPS satellite radio positioning data to determine the corresponding first and second geographical position data with the second, greater degree of accuracy or probability. In the example shown in FIG. 3, the position correction data 40 adjusts the calculated geographical position data 42 by distance 46 in a south direction to the first geographical position data 50 of the receiver 18 of the first communication unit 8, which first geographical position data corresponds to the first geographical position of the receiver 18 of the first communication unit 8. Similarly, the position correction data 40 adjusts the calculated geographical position data 44 by distance 48 in the south direction to the second geographical position data 52 of the receiver 28 of the second communication unit 10, which second geographical position data corresponds to the second geographical position of the receiver 24 of the second communication unit 10. In this manner, errors in the difference between the calculated geographical position data and the actual geographical position of the receivers 18, 28 determined using GPS satellite positioning data 32 alone can be corrected as needed by the position correction data 40.

Figure 4:
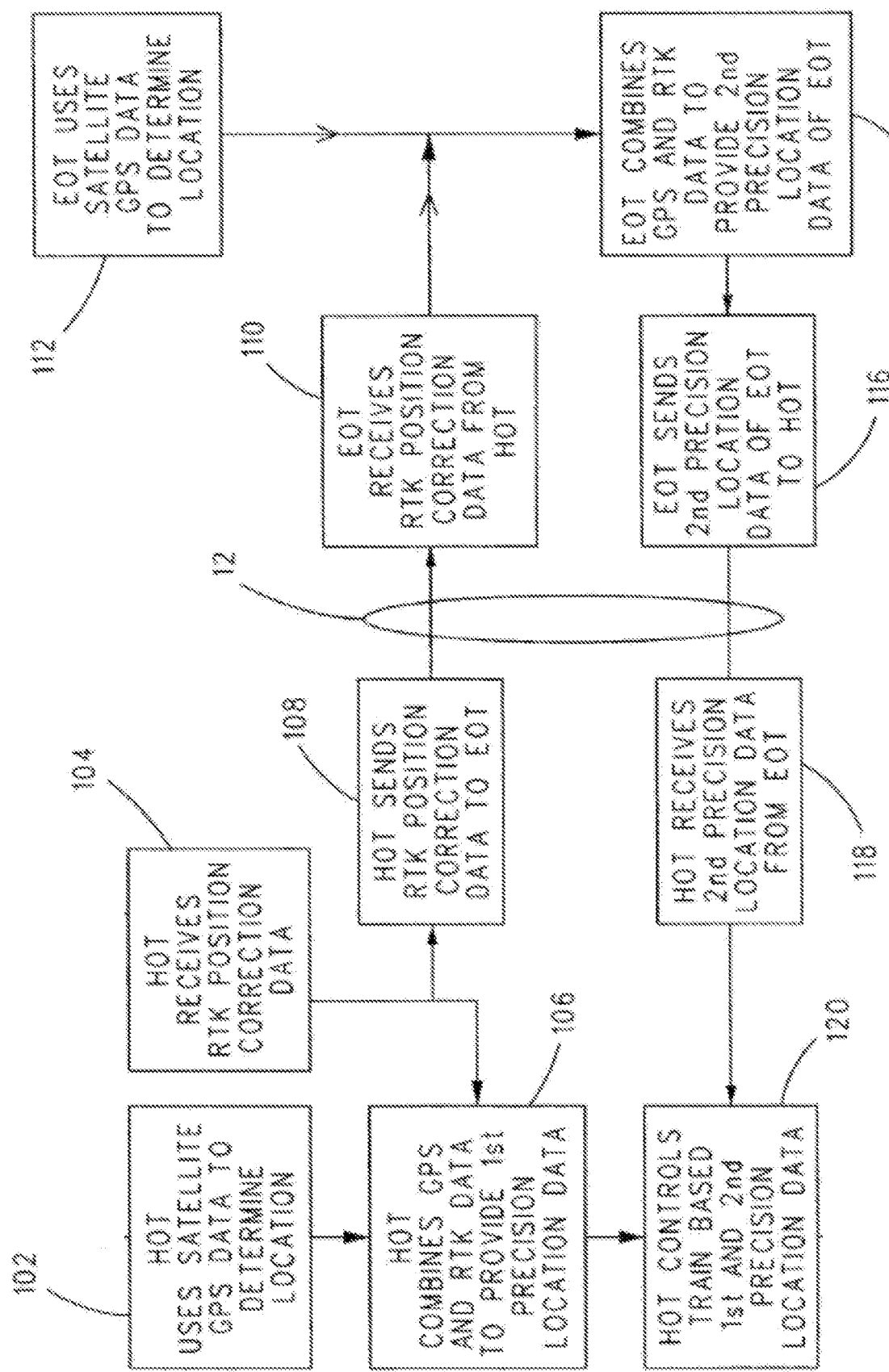
FIG. 4 illustrates a flowchart of one example of a method of correcting GPS satellite positioning data with position correction data.

FIG. 4 illustrates a flowchart of one example of a method of correcting GPS satellite positioning data with position correction data. At 102, received satellite GPS data is used (e.g., by the first communication unit) to determine the location of the first communication unit. At 104, RTK position correction data 40 is received (e.g., by the first communication unit) from the base station 36. At 106, the output of operations 102 and 104 are combined (e.g., by the first communication unit) to provide first, precision, geographical position data of the first communication unit.

At 108, position correction data 40 is sent (e.g., by the first communication unit) to the second communication unit. At 110, the position correction data is received (e.g., by the second communication unit). At 112, satellite GPS data is used (e.g., by the second communication unit) to determine the location (e.g., of the second communication unit). At 114, the satellite GPS data and position correction data 40 are combined (e.g., by the second communication unit) to provide second, precision, geographical position data of the second communication unit. At 116, the second, precision, geographical position data is sent (e.g., by the second communication unit to the first communication unit). At 118, the second, precision, geographical position data is received (e.g., by the first communication unit from the second communication unit). At 120, operation of the vehicle system is controlled based on the first and second, precision, geographical position data.

In the foregoing method, the first, precision, geographical position data corresponds to the first geographical position of the receiver 18 and the second, precision, geographical position data corresponds to the geographical position of the receiver 28. The sending of the position correction data 40 from the first communication unit to the second communication unit at 108 and 110 and the sending of the second, precision, geographical position data of the second communication unit to the first communication unit at 116 and 118 occur via the communication link 12.

The first, precision, geographical position data can be determined by the processor(s) 14 and/or the receiver 18. Similarly, the second, precision, geographical position data can be determined by the processor(s) 24 and/or the radio receiver 28. The method shown in FIG. 4 can be repeated periodically or aperiodically as deemed suitable and/or desirable to enable proper operation of the vehicle system 2. In an example, 102 and 112 can require that the GPS satellite radio positioning data 32 be received by the first and second communication units, respectively.

A method is described herein that includes receiving, by first and second receivers 18, 28 mounted to respective lead and last vehicles of a vehicle system 2, satellite radio positioning data 32; receiving, by the first receiver 18, position correction data 40; determining first geographical position data corresponding to a first geographical position 50 of the first receiver 18 based on the position correction data 40 received by the first receiver 18 and the satellite radio positioning data 32 received by the first receiver 18; receiving a copy of the position correction data 40 (at the last vehicle 6-4 of the vehicle system 2), which was received by the first receiver 18 and where the copy of the position correction data 40 received by the first receiver 18 is communicated from the lead vehicle 4 of the vehicle system 2 to the last vehicle 6-4 or another vehicle of the vehicle system 2; determining second geographical position data corresponding to a second geographical position 52 of the second receiver 28 based on the position correction data 40 received at the last vehicle 6-4 or other vehicle of the vehicle system and the satellite radio positioning data 32 received by the second receiver 28 at the lead vehicle 4 (or another vehicle) of the vehicle system 2 from the last vehicle 6-4 (or another vehicle) of the vehicle system 2; and receiving the second geographical position data that is determined.

The method also can include controlling at least one operation of the vehicle system 2 (e.g., movement) based on at least the second geographical position data that is received. The first geographical position data can be determined by the first processor(s) 14 and/or the first receiver 18. The second geographical position data can be determined by the second processor(s) 24 and/or the second receiver 28.

The position correction data 40 can include a distance and/or a direction 46, 48 to adjust the satellite radio positioning data 32 received by the first and second receivers 18, 28 to determine the respective first geographical position data and the second geographical position data that correspond respectively to the first geographical position 50 of the first receiver 18 and the second geographical position 52 of the second receiver 28.

Also disclosed is a method that includes receiving, by a first receiver 18, satellite radio positioning data 32; receiving, by the first receiver 18, position correction data 40; determining, by the first processor(s) 14 and/or the first receiver 18, a geographical location 50 of the first receiver 18 based on the satellite radio positioning data 32 that is received and the position correction data 40 that is received; receiving, by the second receiver, the satellite radio positioning data 32; receiving, by the second processor(s) from the first processor(s), a copy of the position correction data received by the first receiver 18; and determining, by the second processor(s) 24 and/or the second receiver 28, a geographical location 52 of the second receiver 28 based on the satellite positioning data 32 that is received and the position correction data 40 that is received.

The first receiver 18 receiving (or sampling) satellite radio position or positioning data 32 and the second receiver 30 receiving (or sampling) the satellite radio position or positioning data 32 can include the second receiver 30 receiving (or sampling) the same or different satellite position or positioning data 32 as the first receiver 18. In one non-limiting embodiment or example, the sampling rate of the first and second receivers can be 10 Hz and the first and second receivers can sample at times t1 and t2 separated by 0.05 seconds.

The method can further include receiving (by the first processor(s) from the second processor(s)) the geographical location of the second receiver that is determined. A communication link 12 can communicatively connect the first and second processors 14, 24. The copy of the position correction data 40 can be received by the second processor(s) 24 from the first processor(s) 14 via the communication link 12. The geographical location 52 of the second receiver 28 can be received by the first processor(s) 14 from the second processor(s) 28 via the communication link 12. The communication link 12 can be a radio link or other wireless connection between the first and second transceivers 22, 30. The satellite positioning data 32 can be GPS satellite radio positioning data. The position correction data 40 can be RTK position correction data. The first and second satellite radio position data 32 can be the same or different data.

In one embodiment, a system includes a first communication unit including a first receiver configured to be disposed onboard a vehicle system. The first receiver is configured to receive satellite positioning data and to receive position correction data that is based on phase measurements of satellite signals. The system also includes a second communication unit including a second receiver configured to be disposed onboard the vehicle system in a different location than the first receiver, the second receiver configured to receive the satellite positioning data. The system also includes one or more processors configured to determine first geographical position data corresponding to a first geographical position of the first receiver based on the position correction data and the satellite positioning data received by the first receiver. The one or more processors are configured to communicate the position correction data or a copy of the position correction data to the second communication unit. The one or more processors are configured to determine second geographical position data corresponding to a second geographical position of the second receiver based on the position correction data received at the second communication unit and the satellite positioning data received by the second receiver. The one or more processors are configured to communicate the second geographical position data that is determined to the first communication unit.

Optionally, the one or more processors can be configured to control an operation of the vehicle system based on at least the second geographical position data.

Optionally, the first communication unit can be configured to determine the first geographical position data and the second communication unit is configured to determine the second geographical position data.

Optionally, the first communication unit and the second communication unit can be disposed onboard different vehicles of the vehicle system.

Optionally, the first communication unit can be configured to communicate the position correction data to the second communication unit via one or more wireless communication links.

Optionally, the second communication unit can be configured to communicate the second geographical position data to the first communication unit via one or more wireless communication links.

Optionally, the first receiver can be configured to receive the position correction data from a ground base station.

Optionally, the position correction data can include a distance and a direction adjustment to the satellite positioning data.

In another embodiment, a method includes receiving satellite positioning data at a first communication unit onboard a vehicle system, receiving position correction data that is based on phase measurements of satellite signals at the first communication unit, receiving the satellite positioning data at a second communication unit onboard the vehicle system, determining first geographical position data corresponding to a first geographical position of the first communication unit based on the position correction data and the satellite positioning data received by the first communication unit, receiving the position correction data or a copy of the position correction data at the second communication unit, determining second geographical position data corresponding to a second geographical position of the second communication unit based on the position correction data received at the second communication unit and the satellite positioning data received by the second communication unit, and communicating the second geographical position data that is determined to the first communication unit.

Optionally, the method also includes controlling an operation of the vehicle system based on at least the second geographical position data.

Optionally, the first geographical position data can be determined by the first communication unit and the second geographical position data is determined by the second communication unit.

Optionally, the first communication unit and the second communication unit can be onboard different vehicles in the vehicle system.

Optionally, the position correction data can be received from a ground base station.

Optionally, the position correction data can include a distance and a direction adjustment to the satellite positioning data.

In one embodiment, a system includes a first communication unit configured to be disposed onboard a vehicle system at a first location. The first communication unit is configured to receive satellite positioning data and position correction data that is based on phase measurements of satellite signals from an off-board station. The first communication unit is configured to determine a first geographical position of the first communication unit based on the position correction data and the satellite positioning data. The system also includes a second communication unit configured to be disposed onboard the vehicle system at a second location that is different from the first location. The second communication unit is configured to receive the satellite positioning data and the position correction data. The second communication unit is configured to determine a second geographical position of the second communication unit based on the position correction data and the satellite positioning data. The second communication unit is configured to communicate the second geographical position to the first communication unit for use in controlling an operation of the vehicle system.

Optionally, the first communication unit and the second communication unit can be disposed onboard different vehicles of the vehicle system.

Optionally, the first communication unit can be configured to receive the position correction data from a ground base station.

Optionally, the position correction data can include a distance and a direction adjustment to the satellite positioning data.

Optionally, the system also includes one or more processors configured to change an operation of the vehicle system based on the second geographical position.

Optionally, the one or more processors can be configured to direct one or more vehicles of the vehicle system to increase speed or decrease speed based on the first and second geographical position data.

Although the inventive subject matter has been described in detail for the purpose of illustration based on what is currently considered to be the most practical and preferred embodiments, it is to be understood that such detail is solely for that purpose and that the inventive subject matter is not limited to the disclosed embodiments, but, on the contrary, is intended to cover modifications and equivalent arrangements that are within the spirit and scope of the appended claims. For example, it is to be understood that the present inventive subject matter contemplates that, to the extent possible, one or more features of any embodiment can be combined with one or more features of any other embodiment.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a first communication unit including a first receiver configured to be disposed onboard a vehicle system, the first receiver configured to receive satellite positioning data, the first receiver also configured to receive position correction data that is based on phase measurements of satellite signals;
a second communication unit including a second receiver configured to be disposed onboard the vehicle system in a different location than the first receiver, the second receiver configured to receive the satellite positioning data; and
one or more processors configured to determine first geographical position data corresponding to a first geographical position of the first receiver based on the position correction data and the satellite positioning data received by the first receiver, the one or more processors configured to communicate the position correction data or a copy of the position correction data to the second communication unit,
wherein the one or more processors are configured to determine second geographical position data corresponding to a second geographical position of the second receiver based on the position correction data received at the second communication unit and the satellite positioning data received by the second receiver, the one or more processors configured to communicate the second geographical position data that is determined to the first communication unit,
wherein the one or more processors are configured to control an operation of the vehicle system based on at least the second geographical position data.

2. The system of claim 1, wherein the first communication unit is configured to determine the first geographical position data and the second communication unit is configured to determine the second geographical position data.

3. The system of claim 1, wherein the first communication unit and the second communication unit are disposed onboard different vehicles of the vehicle system.

4. The system of claim 1, wherein the first communication unit is configured to communicate the position correction data to the second communication unit via one or more wireless communication links.

5. The system of claim 1, wherein the second communication unit is configured to communicate the second geographical position data to the first communication unit via one or more wireless communication links.

6. The system of claim 1, wherein the first receiver is configured to receive the position correction data from a ground base station.

7. The system of claim 1, wherein the position correction data comprises a distance and a direction adjustment to the satellite positioning data.

8. A method comprising:
receiving satellite positioning data at a first communication unit onboard a vehicle system;
receiving position correction data that is based on phase measurements of satellite signals at the first communication unit;
receiving the satellite positioning data at a second communication unit onboard the vehicle system;
determining first geographical position data corresponding to a first geographical position of the first communication unit based on the position correction data and the satellite positioning data received by the first communication unit;
receiving the position correction data or a copy of the position correction data at the second communication unit;
determining second geographical position data corresponding to a second geographical position of the second communication unit based on the position correction data received at the second communication unit and the satellite positioning data received by the second communication unit;
communicating the second geographical position data that is determined to the first communication unit; and
controlling an operation of the vehicle system based on at least the second geographical position data.

9. The method of claim 8, wherein the first geographical position data is determined by the first communication unit and the second geographical position data is determined by the second communication unit.

10. The method of claim 8, wherein the first communication unit and the second communication unit are onboard different vehicles in the vehicle system.

11. The method of claim 8, wherein the position correction data is received from a ground base station.

12. The method of claim 8, wherein the position correction data comprises a distance and a direction adjustment to the satellite positioning data.

13. A system comprising:
a first communication unit configured to be disposed onboard a first vehicle, the first communication unit configured to receive position correction data that is based on phase measurements of satellite signals and to receive first satellite positioning data, the first communication unit configured to determine a first geographical position of the first communication unit based on the position correction data and the first satellite positioning data;
a second communication unit configured to be disposed onboard a second vehicle, the second communication unit configured to receive the position correction data from the first communication unit and to receive second satellite positioning data, the second communication unit configured to determine a second geographical position of the second communication unit based on the position correction data and the second satellite positioning data; and
at least one processor onboard at least one of the first vehicle or the second vehicle and configured to control operations of one or more of the first vehicle or the second vehicle based on at least one of the first geographical position or the second geographical position,
wherein the second communication unit is further configured to communicate the second geographical position to the first communication unit, and
wherein the at least one processor is onboard the first vehicle and is configured to control operations of a vehicle system that includes the first vehicle and the second vehicle based on the first geographical position and the second geographical position.

14. The system of claim 13, wherein the second communication unit is further configured to communicate the second geographical position to the first communication unit, and
    wherein the at least one processor is onboard the first vehicle and is configured to control the operations of the first vehicle based at least in part on the second geographical position.

15. The system of claim 13, wherein the first communication unit is configured to receive the position correction data from a ground base station.

16. The system of claim 13, wherein the position correction data comprises a distance and a direction adjustment to the first satellite positioning data.

17. The system of claim 13, wherein the at least one processor is configured to direct one or more vehicles of the vehicle system to increase speed or decrease speed based on the first geographical position and the second geographical position.

\* \* \* \* \*